(12) United States Patent
Yeh et al.

(10) Patent No.: US 7,925,234 B2
(45) Date of Patent: Apr. 12, 2011

(54) METHOD FOR MAXIMAL RATIO COMBINING OF SPATIALLY FILTERED SIGNALS AND APPARATUS THEREFOR

(75) Inventors: Choong-Il Yeh, Daejeon (KR); Jae-Joon Park, Daejeon (KR); Chul-Sik Yoon, Seoul (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd., Seoul (KR); Hanaro Telecom, Inc., Seoul (KR)

( * ) Notice: Subject to any disclaimer, the term of this patent is extended or adjusted under 35 U.S.C. 154(b) by 576 days.

(21) Appl. No.: 12/088,109

(22) PCT Filed: Sep. 28, 2006

(86) PCT No.: PCT/KR2006/003883
§ 371 (c)(1),
(2), (4) Date: Mar. 26, 2008

(87) PCT Pub. No.: WO2007/037630
PCT Pub. Date: Apr. 5, 2007

(65) Prior Publication Data
US 2008/0214218 A1 Sep. 4, 2008

(30) Foreign Application Priority Data

Sep. 28, 2005 (KR) .................. 10-2005-0090348
Sep. 27, 2006 (KR) .................. 10-2006-0093908

(51) Int. Cl.
*H04B 1/06* (2006.01)

(52) U.S. Cl. .......... 455/273; 455/25; 455/63.4; 455/137; 455/562.1; 343/374

(58) Field of Classification Search ............ 455/273, 455/25, 63.4, 137, 562.1, 177.1, 450, 550.1, 455/500, 575.7, 101, 561, 132, 62; 375/242, 375/260.4; 370/327, 337, 334, 345; 342/373–375, 342/381, 384
See application file for complete search history.

(56) References Cited

U.S. PATENT DOCUMENTS

| | | | |
|---|---|---|---|
| 5,280,637 A | 1/1994 | Larosa et al. | |
| 5,585,803 A | 12/1996 | Miura et al. | |
| 6,496,157 B1 | 12/2002 | Mottier | |
| 6,778,514 B1 * | 8/2004 | Boccuzzi et al. | 370/334 |

(Continued)

FOREIGN PATENT DOCUMENTS

KR    10-2000-0045985 A    7/2000

*Primary Examiner* — Pablo N Tran
(74) *Attorney, Agent, or Firm* — Jefferson IP Law, LLP

(57) ABSTRACT

The present invention relates to a maximum ratio combining method of spatial-filtered received signals and an apparatus using the same. For this purpose the present invention provides a method for receiving signals by using a plurality of antennas that form a linear array antenna, multiplying a plurality of weight vectors by the received signals, summing the multiplication results for each weight vector, and combining the summing results by using maximum ratio combining. According to the present invention, signals are dividedly received by applying spatial filtering for a receiving direction of each signal and performance can be improved by combining the received signals by using maximum ratio combining. In addition, performance of an MRC-rake and a beam forming gain can be simultaneously acquired according to the present invention.

11 Claims, 4 Drawing Sheets

U.S. PATENT DOCUMENTS

| | | |
|---|---|---|
| 6,801,564 B2 | 10/2004 | Rouphel et al. |
| 6,892,059 B1 | 5/2005 | Kim et al. |
| 6,917,337 B2 | 7/2005 | Iida et al. |
| 6,917,340 B2 | 7/2005 | Lindenmeier |
| 7,013,165 B2 * | 3/2006 | Yoon et al. .................... 455/561 |
| 7,092,690 B2 * | 8/2006 | Zancewicz ................... 455/273 |
| 7,139,328 B2 * | 11/2006 | Thomas et al. ............... 375/299 |
| 7,167,526 B2 * | 1/2007 | Liang et al. .................. 375/267 |
| 7,236,478 B2 * | 6/2007 | Wu et al. ....................... 370/334 |
| 7,623,563 B2 * | 11/2009 | Jwa et al. ...................... 375/144 |
| 2004/0043795 A1 * | 3/2004 | Zancewicz ................. 455/562.1 |
| 2004/0204111 A1 * | 10/2004 | Ylitalo ....................... 455/562.1 |
| 2005/0101353 A1 * | 5/2005 | Zeira et al. ................. 455/562.1 |
| 2006/0148525 A1 * | 7/2006 | Moon et al. ................ 455/562.1 |
| 2009/0239551 A1 * | 9/2009 | Woodsum .................. 455/456.1 |

\* cited by examiner

[Fig.3]
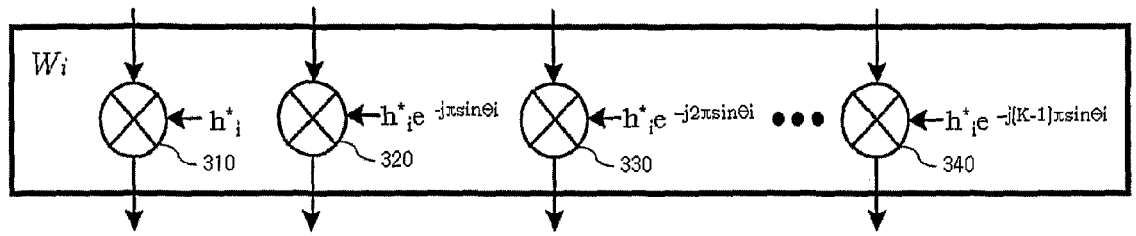
[Fig.4]
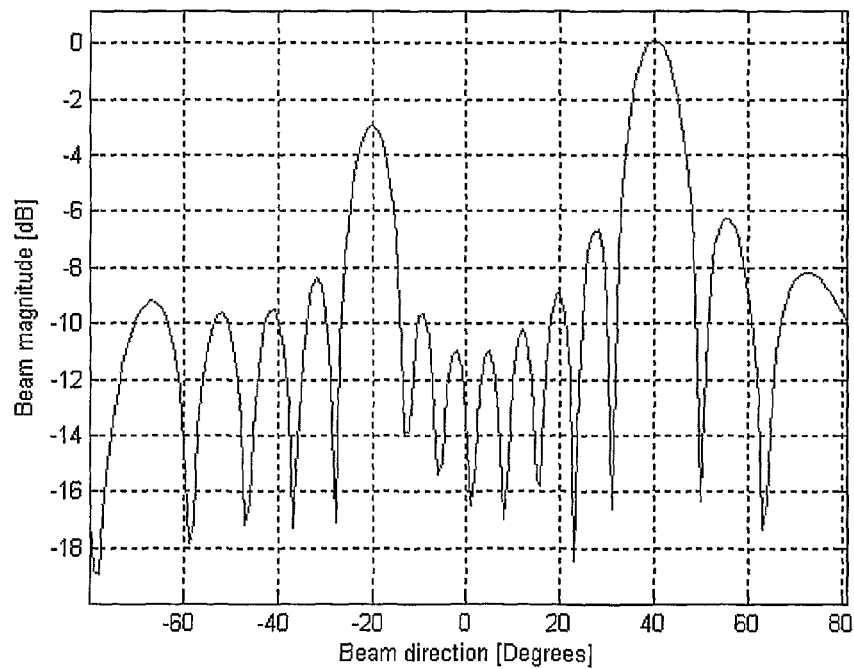

METHOD FOR MAXIMAL RATIO COMBINING OF SPATIALLY FILTERED SIGNALS AND APPARATUS THEREFOR

TECHNICAL FIELD

The present invention relates to a method for maximum ratio combining of spatial-filtered signals, and an apparatus using the same. More particularly, it relates to a method for receiving signals received in different directions through a linear array antenna formed of wavelength-spaced antennas by applying spatial filtering, and combining the received signals by using maximum ratio combining, and an apparatus using the same.

BACKGROUND ART

In a mobile communication system, antenna diversity can be obtained by multiple antennas provided in a mobile station and a base station transmission apparatus and thus reliability of signals transmitted between the base station transmitting apparatus and the mobile station can be increased.

In a wireless base station that transmits/receives signals by using a plurality of antennas, a smart antenna obtains an antenna gain by multiplying weight vectors by signals transmitted/received through a plurality of antennas and moderates co-channel interference at the same time, thereby improving system performance, wherein the plurality of antennas are spaced by half-wavelengths from each other and form a linear array antenna.

The smart antenna algorithm is divided into a switching-beam algorithm and an adaptive-beam algorithm depending on a weighting vector decision method.

The switching beam algorithm prepares a set of predefined weighting vectors and selects an appropriate weighting vector from among them depending on circumstances. Such a switching beam algorithm prepares and stores the weighting vector set in advance, and accordingly necessitates an increase in capacity of hardware and software. In addition, it is difficult to calculate an optimal weighting vector since the most appropriate weighting vector for the corresponding condition is selected from the predefined weighting vector set.

The adaptive-beam forming algorithm selects the most appropriate weighting vector by using various algorithms. A smart antenna algorithm using such an adaptive-beam forming algorithm selects a weighting vector by using sample matrix inversion (SMI), least mean square (LMS), recursive least square (RLS), constant modulus algorithm (CMA), conjugate gradient, and neural network approaches.

However, a weighting vector selection method of the smart antenna algorithm using such an adaptive-beam forming algorithm requires a training signal for selecting a weighting vector, and therefore it is difficult to apply this method to a packet signal that contains a small amount of data. In addition, the weighting vector selection method performs too many computations, requiring complex hardware and software configurations.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for separately receiving signals that are received in different directions through a linear array antenna by applying spatial filtering, the linear array antenna formed of half-wavelength antennas, and combining received signals by using maximum ratio combining to thereby simultaneously achieve rake receiving performance and beam forming gain in a smart antenna system using an adaptive beam forming algorithm.

Technical Solution

A method for combining received signals transmitted from a mobile station to a base station through a linear array antenna according to an embodiment of the present invention is provided. The method includes (a) receiving signals by using a plurality of antennas forming the linear array antenna; (b) multiplying a plurality of weight vectors by the signals, respectively; (c) summing results of the multiplication between the weight vectors and the received signals for each weight vector; and (d) combining a result of the sum for each weight vector.

A method for combining received signals transmitted from a mobile station to a base station through a linear array antenna by using maximum ratio combining (MRC), the method including: (a) receiving signals, each having a different angle of arrival (AOA) by using a plurality of antennas forming the linear array antenna; (b) multiplying a plurality of predetermined weight vectors by the received signals according to an AOA; (c) summing results of the multiplication of the weight vectors and received signals for each weight vector; and (d) combining results of the sums for each weight value vector.

A combining apparatus according to another exemplary embodiment of the present invention is provided to combine received signals transmitted from a mobile station to a base station by using maximum ratio combining. The combining apparatus includes a plurality of antennas, a plurality of vector processors, a plurality of summing units, and a combiner. The plurality of antennas respectively receive signals transmitted from the mobile station. The plurality of weight vector processors store predetermined weight vectors for multiplication with the signals received through the antennas. The plurality of summing units receive results of the multiplication of the weight vectors and the received signals from the respective weight vector processors and sum the results. The combiner receives results of the sum from the plurality of summing units and combines the results.

DESCRIPTION OF DRAWINGS

FIG. 3 is a block diagram schematically showing an internal structure of a weight vector processor according to the second exemplary embodiment of the present invention.

FIG. 4 is an exemplary graph showing beams received through a linear array antenna according to the first and second exemplary embodiments of the present invention.

Figure 1:
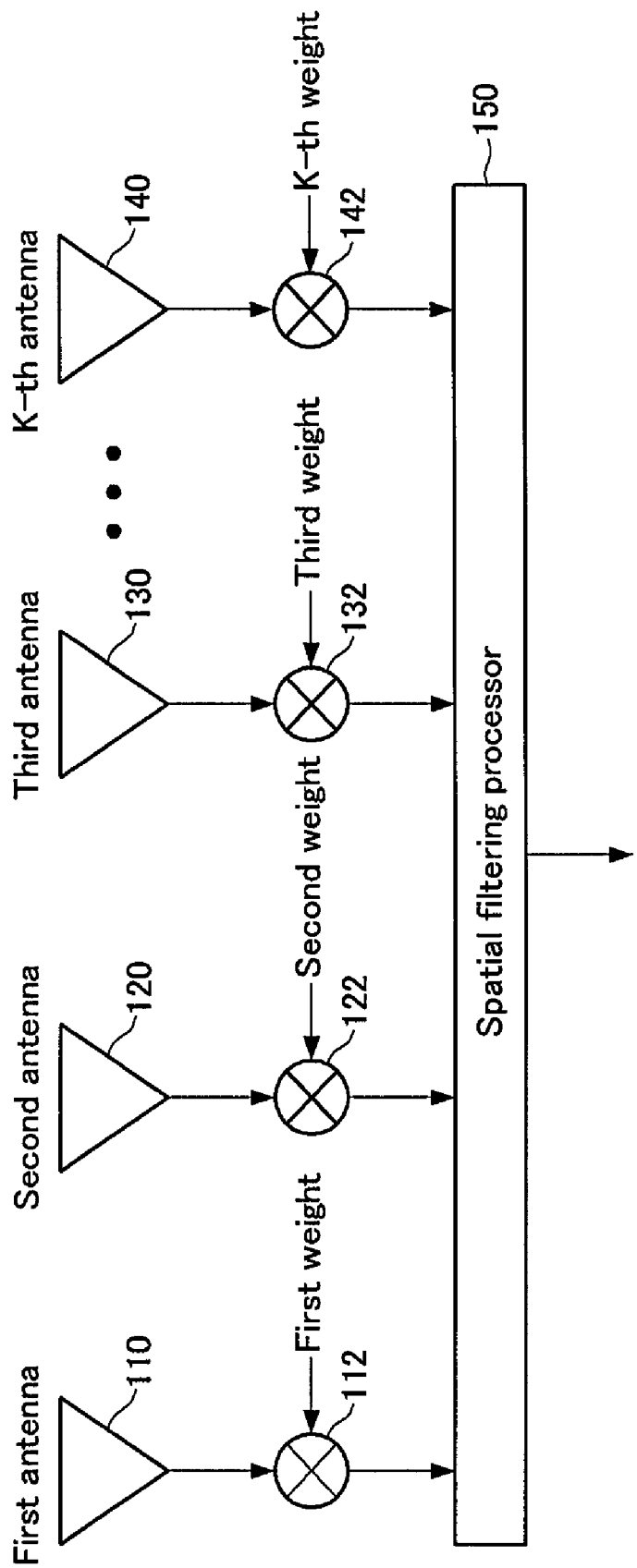
FIG. 1 shows a process for assigning a weight of a linear array antenna formed of half-wavelength spaced antennas according to a first exemplary embodiment of the present invention.

of spatial-filtered received signals according to the second exemplary embodiment of the present invention.

BEST MODE

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" or variations such as "comprises" or "comprising" will be understood to imply the inclusion of stated elements but not the exclusion of any other elements.

In addition, throughout this specification and the claims which follow, a module means a unit that performs a specific function or operation, and can be realized by hardware or software, or a combination of both.

FIG. 1 shows a process for assigning a weight of a linear array antenna formed of half-wavelength spaced antennas according to a first exemplary embodiment of the present invention.

A linear array antenna for weight assignment according to an exemplary embodiment of the present invention includes a plurality of antennas (i.e., a first antenna 110 to the K-th antenna 140), a plurality of weight operation units (i.e., a first weight operation unit 112 to the K-th weight operation unit 142), and a spatial filtering processor 150.

The first antenna 110 to the K-th antenna 140 are spaced half-wavelengths from each other and form an array antenna.

A signal (hereinafter called "first received signal") is multiplied by a weight (i.e., a first weight) that is appropriate for a signal received at the first weight operation unit 112, and a signal (hereinafter called "second received signal") is multiplied by a weight (i.e., a second weight) that is appropriate for a signal received at the second weight operation unit 122.

The first received signal multiplied by the first weight and the second received signal multiplied by the second weight are transmitted to the spatial filtering processor 150.

When signals received through the third antenna 130 to the K-th antenna 140 are respectively multiplied by a third weight to the K-th weight by the third weight operation unit 130 to the K-th weight operation unit 142 and then transmitted to the spatial filtering processor 150, the spatial filtering processor 150 sums the signals transmitted from the first to K-th weight operation units 112 to 142 and outputs the spatial filtering effect oriented in a specific receiving direction.

In this case, an index k is used for identifying each antenna element forming the array antenna. Herein, k is an integer that is equal to or greater than 1 and less than or equal to K.

A signal transmitted from a mobile station is received at a base station through various propagation paths. The number of uplink propagation paths is denoted by P, and an index p is used for identifying each path. Herein, p is an integer that is equal to or greater than 1 and less than or equal to P.

In addition, when a signal transmitted from the mobile station to the array antenna with an incident angle of $\theta_p$ through the p-th propagation path, a channel coefficient associated with the k-th antenna can be represented as $h_p e^{jk\pi \sin \theta_p}$.

Figure 2:
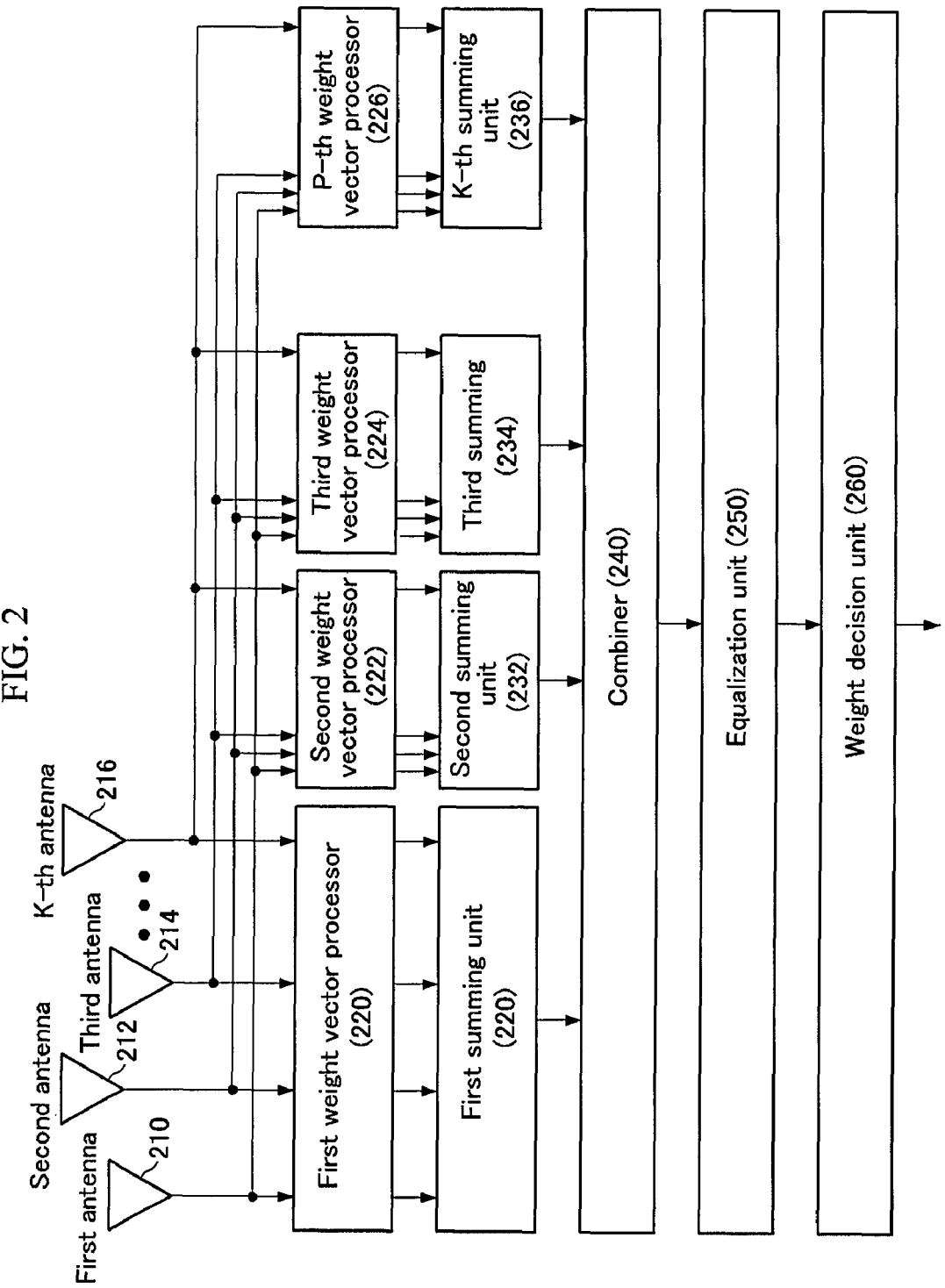
FIG. 2 shows a process of combining divided received signals by using maximum ratio combining (MRC) of simultaneously spatial-filtered received signals according to a second exemplary embodiment of the present invention.

Therefore, when the signal transmitted from the mobile station is denoted as s, a signal r received at the base station can be represented as given in Math Figure 1.

$$r = s(H_1 + H_2 + \ldots + H_p) = sH \quad \text{[Math Figure 1]}$$

where $H_p$ denotes a channel coefficient vector, which can be represented as given in Math Figure 2.

$$H_p = [h_p \; h_p e^{j\pi \sin \theta_p} \; h_p e^{j2\pi \sin \theta_p} \ldots h_p e^{j(K-1)\pi \sin \theta_p}] \quad \text{[Math Figure 2]}$$

Herein, when the base station is aware of $h_p$ and $\theta_p$, an incident signal at a direction of $\theta_p$ can be selectively received by applying a weight vector $W_p$ to Math Figure 2.

$$W_p = \begin{bmatrix} h_p^* \\ h_p^* e^{-j\pi \sin \theta_p} \\ h_p^* e^{-j2\pi \sin \theta_p} \\ \ldots \\ h_p^* e^{-j(K-1)\pi \sin \theta_p} \end{bmatrix} \quad \text{[Math Figure 3]}$$

In this case, when $h_p$ values and $\theta_p$ values for all propagation paths are known, spatial filtering that is proportional to a receiving intensity can be performed for each receiving path. In addition, simultaneously spatial-filtered received signals can be demodulated by combining them. Such a demodulation method is called maximum ratio combining (MRC).

FIG. 2 shows a process for combining divided received signals by using MRC of simultaneously spatial-filtered received signals according to a second exemplary embodiment of the present invention.

An apparatus for combining divided received signal by using the MRC of the received signals includes a plurality of antennas 210 to 216, a plurality of weight vector processors 220 to 226, a plurality of summing units 230 to 236, a combiner 240, an equalization unit 250, and a weight decision unit 260.

Signals received through the first antenna 210 to the K-th antenna 216 are respectively transmitted to P weight vector processors 220 to 226. That is, the first weight vector processor 220 to the P-th weight vector processor 226 respectively receive the signals from the first antenna 210 to the K-antenna 216 and multiply predetermined weight vectors $W_1$ to $W_p$ by the respective received signals. Herein, an internal structure of the weight vector processors 220 to 260 that multiply the predetermined weight vectors by the signals that have been respectively received through each antenna will be described in more detail with reference to FIG. 3.

The received signals respectively multiplied by the predetermined weight vectors by the weight vector processors 220 to 226 are transmitted to the summing units 230 to 236 respectively connected to the corresponding weight vector processors. The summing units 230 to 236 sum the signals respectively multiplied by the respective weight vectors and transmit a summed result to the combiner 240.

That is, the signals respectively received through the first antenna 210 to the K-th antenna 216 are transmitted to the first weight vector processor 220, and the first weight vector processor 220 multiplies the first weight vector by each signal and transmits the multiplication result to the first summing unit 120. Then the first summing unit 120 adds the signals respectively multiplied by the first weight vector and transmits the addition result to the combiner 240.

In this way, the first summing unit 230 to the P-th summing unit 236 transmit each addition result (i.e., the first addition result to the P-th addition result) to the combiner 240. The combiner 240 combines the respective addition results and transmits the combination result to the equalization unit 250. Herein, an output signal of the combiner 240 is formed by the MRC of spatial-filtered received signals as given in Math Figure 4.

$$(W_1+W_2+\ldots+W_p)^t sH \qquad \text{[Math Figure 4]}$$

The equalization unit 250 equalizes the output signal of the combiner 240, and the weight decision unit 260 determines a weight from an equalized combination of the output signals.

With such a configuration, the spatial-filtered received signals can be combined by using the MRC.

FIG. 3 is a block diagram of an internal structure of the weight vector processor according to the second exemplary embodiment of the present invention.

The weight vector processors 220 to 226 according to the second exemplary embodiment of the present invention respectively include a plurality of weight operation units 310 to 340.

Each weight operation unit multiplies a signal received through each antenna by the corresponding weight. That is, the first weight value operation unit 310 multiplies the first received signal received through the first antenna 210 by the first weight, and the second weight operation unit 320 multiplies the second received signal received through the second antenna 212 by the second weight. In this way, the K-th weight operation unit 340 multiplies the K-received signal received through the K-th antenna 216 by the K-th weight.

In this case, the respective weights multiplied by the respective received signals by the first weight operation unit 310 to the K-th weight operation unit 340 of the i-th weight vector processor can be defined as $h^*_i$, $h^*_i e^{-j\pi \sin \Theta i}$, $h^*_i e^{-j2\pi \sin \Theta i}$, and $h^*_i e^{-j(K-1)\pi \sin \Theta i}$, respectively, by applying the weight vector $W_p$ to Math Figure 3.

The weights are respectively multiplied by the first received signal to the K-th received signal by the respective weight operation units, and the respective multiplication results are transmitted to the summing units 230 to 236 respectively connected to the weight vector processor 220 to 260.

The summing units 230 to 236 sum the multiplication values transmitted from the first weight operation unit 310 to the K-th weight operation unit 340 and outputs the summing result.

FIG. 4 is an exemplary graph showing a beam received through a linear array antenna according to the exemplary embodiment of the present invention.

The linear array antenna according to the exemplary embodiment of the present invention may receive various types of beams according to a receiving direction and intensity of the signal.

In the present embodiment, the receiving direction is set between an angle of −20 degree and an angle of +40 degree, and the intensity of a signal received at the angle of +40 degree is two times greater than the intensity of a signal received at the angle of −20 degree.

Figure 5:
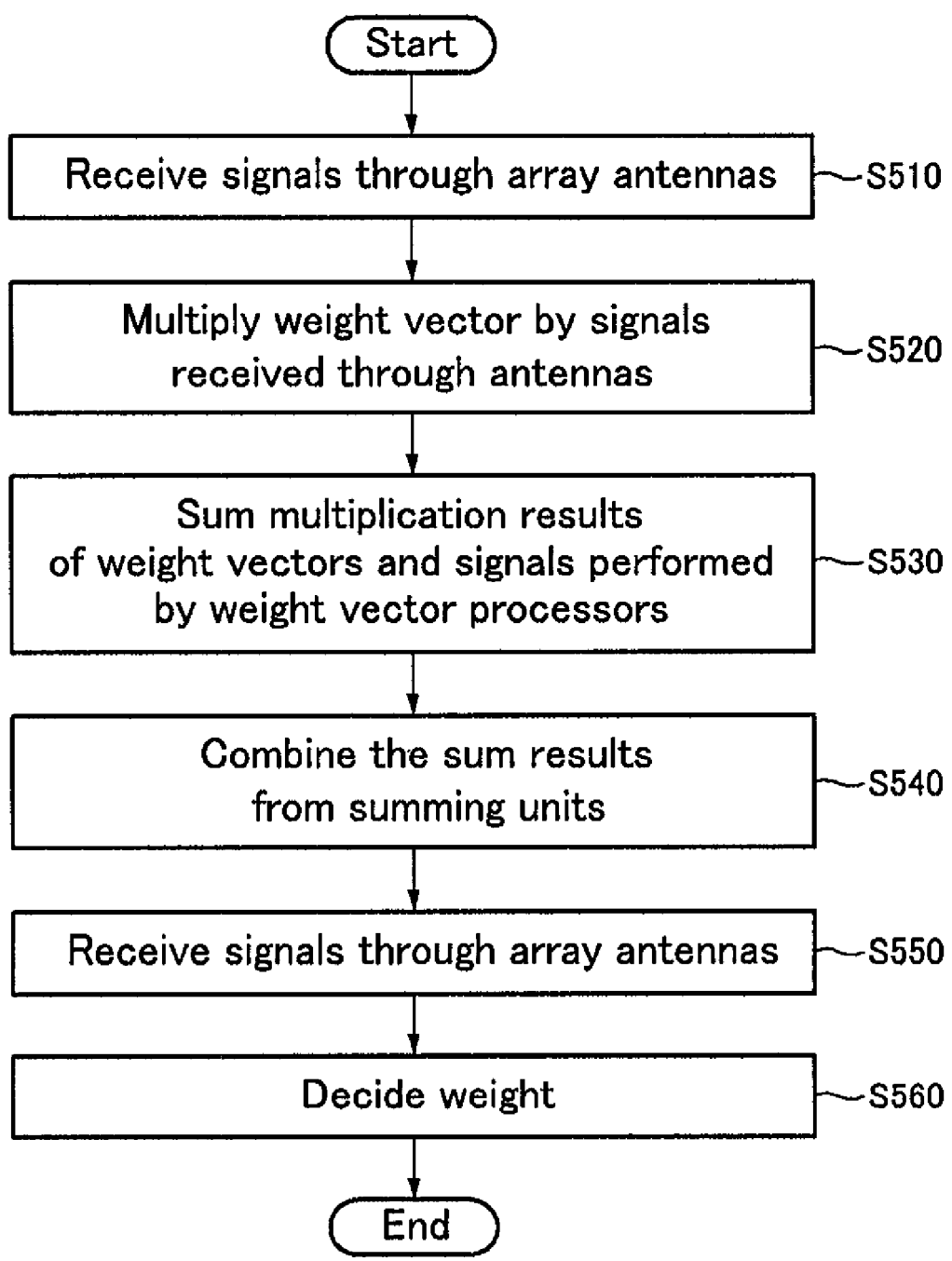
FIG. 5 is a flowchart of a process of combining divided received signals by using maximum ratio combining (MRC)

FIG. 5 is a flowchart showing a process for combining divided received signals by using the MRC of the spatial-filtered received signal according to the second exemplary embodiment of the present invention.

In order to combine divided received signals by using the MRC of the spatial-filtered signals according to the second exemplary embodiment of the present invention, the base station receives signals through array antennas of the first antenna 210 to the K-th antenna 216 in step S510.

The received signals are forwarded to the plurality of weight vector processors. Each weight vector processor multiplies the received signals by the corresponding predetermined weight vectors. The multiplication of the received signals and the predetermined weight vectors are respectively performed by the plurality of weight vector processors in step S520.

Results of the multiplications of the received signals and the weight vectors performed by the plurality of weight vector processors are transmitted to the summing units connected to the respective weight vector processors. Each summing unit adds the multiplication results transmitted from the weight vector processors and outputs a result of the addition. That is, the plurality of summing units respectively receives the multiplication results and output results of the respective additions in step S530.

When a plurality of addition results are output from the plurality of summing units, the combining unit combines the plurality of addition results in step S540. Accordingly, through such a communication, signals that are received at different directions from each other through the linear array antenna can be combined by using the MRC.

When the received signals are combined, the equalization unit 250 equalizes an output signal of the combiner in step S550, and the weight decision unit 260 determines a weight from the equalized combination of the output signals in step S560.

As shown in FIG. 1 to FIG. 5, an antenna weight can be determined using the above-described method that is different from conventional methods such as SMI, LMS, RLS, CMA, a conjugate gradient method, and a neural network approach.

For implementation of the above-described embodiments, signals received through an array antenna formed of half-wavelength spaced antennas must maintain a complete correlation between each other.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, signals are dividedly received by performing spatial filtering on the received signals for each receiving direction and the dividedly received signals are combined by using MRC such that improvement in performance can be achieved, and performance of rake-MRC and beam forming gain can be simultaneously acquired.

The invention claimed is:

1. A method for combining received signals transmitted from a mobile station to a base station through a linear array antenna by using maximal ratio combining (MRC), the method comprising:
   (a) receiving signals by using a plurality of antenna elements forming the linear array antenna;
   (b) multiplying a plurality of predetermined weight vectors by the received signals, respectively;

(c) summing results of the multiplication of the weight vectors and the received signals for each weight vector; and (d) combining a result of the sum.

2. The method of claim 1, further comprising:

(e) equalizing the combination results output from (d); and (f) outputting a weight from the equalized combination results.

3. The method of claim 1, wherein the received signal r in (a) is $$r = s(H_1 + H_2 + \ldots + H_p) = sH$$

(where s denotes a signal transmitted from the portable subscriber station, $H_p$ denotes a channel coefficient vector of $H_p = [h_p\ h_p e^{j\pi \sin\theta_p}\ h_p e^{j2\pi \sin\theta_p} \ldots h_p e^{j(K-1)\pi \sin\theta_p}]$, P denotes an index of the number P of uplink propagation paths, and $\theta_p$ denotes an angle of incidence of a signal transmitted from a mobile station to an array antenna through the p-th propagation path).

4. The method of claim 3, wherein the weight vector $W_p$ of (d) is $$W_p = \begin{bmatrix} h_p^* \\ h_p^* e^{-j\pi \sin\theta_p} \\ h_p^* e^{-j2\pi \sin\theta_p} \\ \ldots \\ h_p^* e^{-j(K-1)\pi \sin\theta_p} \end{bmatrix}.$$

5. The method of claim 4, wherein, in (d), the received signals resulted from the combining of the summing results for each weight vector can be represented as $(W_1 + W_1 + \ldots + W_p)^T sH$.

6. A method for combining received signals transmitted from a mobile station to a base station through a linear array antenna by using maximum ratio combining, the method comprising:

(a) receiving signals, each having a different angle of arrival (AOA) by using a plurality of antennas forming the linear array antenna;

(b) multiplying a plurality of predetermined weight vectors by the received signals according to an AOA;

(c) summing results of the multiplication of the weight vectors and received signals for each weight vector; and (d) combining results of the sums.

7. A combining apparatus for combining received signals transmitted from a mobile station to a base station by using maximum ratio combining, the combining apparatus comprising:

a plurality of antennas for respectively receiving signals transmitted from the mobile station;

a plurality of weight vector processors for storing predetermined weight vectors for multiplication with the signals received through the antennas;

a plurality of summing units for receiving results of the multiplication of the weight vectors and the received signals from the respective weight vector processors and summing the results; and a combiner for receiving results of the sum from the plurality of summing units and combining the results.

8. The combining apparatus of claim 7, further comprising:

an equalization unit for equalizing combination values of the received signals from the combiner; and a weight decision unit for outputting a weight from the equalized combination values.

9. The combining apparatus of claim 7, wherein the plurality of antennas are spaced by half-wavelengths from each other and form a linear array antenna.

10. The combining apparatus of claim 7, wherein the weight vector processor comprises a plurality of weight operation units for respectively multiplying a plurality of weight vectors by the signals received through the plurality of antennas.

11. The combining apparatus of claim 7, wherein the summing units are respectively connected to the weight vector processors.

* * * * *